US012602926B2

(12) United States Patent
Kavuri et al.

(10) Patent No.: US 12,602,926 B2
(45) Date of Patent: Apr. 14, 2026

(54) ATTENTION MONITORING IN A VIDEO CONFERENCING SESSION

(71) Applicant: Capital One Services, LLC, McLean, VA (US)

(72) Inventors: Vamsi Kavuri, Glen Allen, VA (US); Jignesh Rangwala, Glen Allen, VA (US); Lee Adcock, Midlothian, VA (US); Mehulkumar Jayantilal Garnara, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 332 days.

(21) Appl. No.: 18/065,074

(22) Filed: Dec. 13, 2022

(65) Prior Publication Data

US 2024/0193944 A1 Jun. 13, 2024

(51) Int. Cl.
*G06V 20/40* (2022.01)
*G06V 10/70* (2022.01)
*G06V 40/18* (2022.01)
*G08B 3/10* (2006.01)
*H04L 65/403* (2022.01)

(52) U.S. Cl.
CPC .............. *G06V 20/40* (2022.01); *G06V 10/70* (2022.01); *G06V 40/18* (2022.01); *G08B 3/1008* (2013.01); *H04L 65/403* (2013.01)

(58) Field of Classification Search
CPC ....... H04L 65/403; G06V 20/40; G06V 10/70
USPC ...................................................... 348/14.08
See application file for complete search history.

(56) References Cited

U.S. PATENT DOCUMENTS

| | | | | |
|---|---|---|---|---|
| 11,056,014 B1 * | 7/2021 | Chasen | .................... | G09B 7/00 |
| 2023/0128024 A1 * | 4/2023 | Du | ........................... | G09B 5/14 |
| | | | | 345/419 |
| 2023/0261894 A1 * | 8/2023 | Srivastava | .......... | H04L 12/1831 |
| | | | | 709/204 |

OTHER PUBLICATIONS

Anonymous; "How to check if people paying attention in online meetings"; Jan. 30, 2021; 4 pages; City College of New York; https://www.haptic.ro/how-to-check-if-people-paying-attention-in-online-meetings/.
Anonymous; "Track Participant Focus During The Session"; kaltura knowledge center; 5 pages; retrieved from the world wide web Dec. 12, 2022; https://knowledge.kaltura.com/help/track-participant-focus-during-the-session.

* cited by examiner

*Primary Examiner* — Amal S Zenati
(74) *Attorney, Agent, or Firm* — Harrity & Harrity, LLP

(57) ABSTRACT

In some implementations, a system may receive user data from a plurality of user devices corresponding to a plurality of users participating in a video conferencing session. The system may provide, based on the user data and as input to a machine learning model, user attention data associated with attentions of the plurality of users with respect to the video conferencing session. The machine learning model may be trained based on historical user attention data associated with a plurality of historical video conferencing sessions. The system may receive, as output from the machine learning model, an indication that one or more non-attentive users, of the plurality of users, are not attentive to the video conferencing session. The system may perform, based on the indication, one or more actions to gain attention from the one or more non-attentive users.

20 Claims, 7 Drawing Sheets

100

| User | User Type | Attentive? |
|------|-----------|------------|
| User 1 | Host | Yes |
| User 2 | Guest | No |
| • • • | • • • | • • • |
| User *n* | Guest | No |

Attention
Monitoring
System

110
Identify non-attentive
users

Historical
Database

100

400

Bus
410

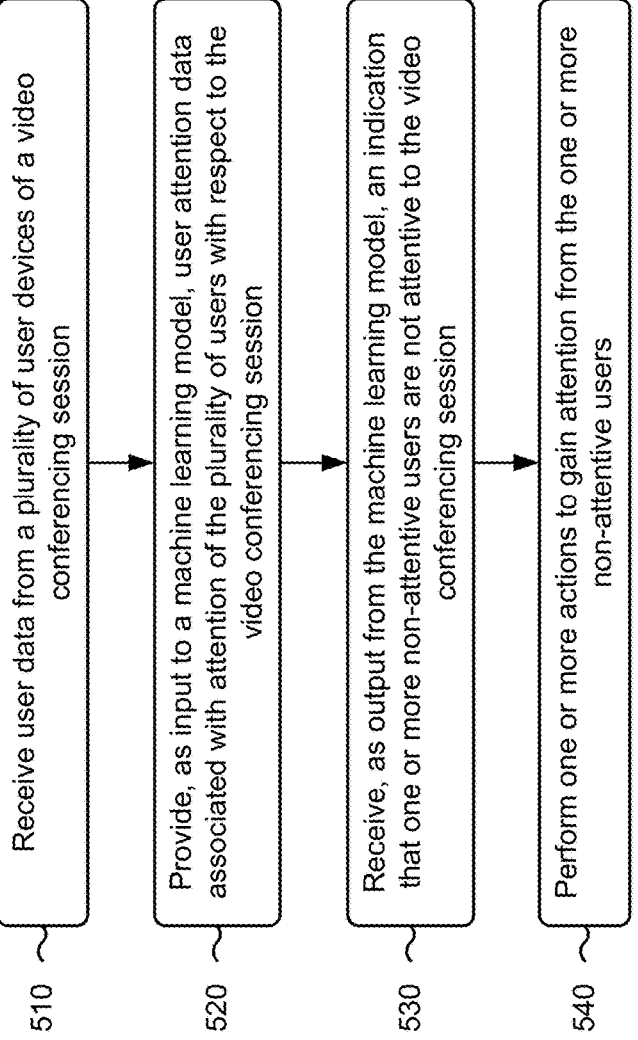

500

510 Receive user data from a plurality of user devices of a video conferencing session 520 Provide, as input to a machine learning model, user attention data associated with attention of the plurality of users with respect to the video conferencing session 530 Receive, as output from the machine learning model, an indication that one or more non-attentive users are not attentive to the video conferencing session 540 Perform one or more actions to gain attention from the one or more non-attentive users

FIG. 5

ATTENTION MONITORING IN A VIDEO CONFERENCING SESSION

BACKGROUND

Video conferencing involves the reception and transmission of audio-video signals by users at different locations, which enables communication between the users in real time. Video conferencing may be supported using a wide variety of devices, such as mobile phones, desktop computers, laptop computers, tablet computers, and/or smart televisions. Video conferencing may be useful in a workplace environment, in which users are located in different geographical regions. Video conferencing may provide other features, such as screen sharing, chat, meeting recording and transcription, etc.

SUMMARY

Some implementations described herein relate to a system for monitoring attention in a video conferencing session. The system may include one or more memories and one or more processors communicatively coupled to the one or more memories. The one or more processors may be configured to receive user data from a plurality of user devices corresponding to a plurality of users participating in the video conferencing session. The one or more processors may be configured to provide, based on the user data and as input to a machine learning model, user attention data associated with attentions of the plurality of users with respect to the video conferencing session. The one or more processors may be configured to receive, as output from the machine learning model, an indication that one or more non-attentive users, of the plurality of users, are not attentive to the video conferencing session. The one or more processors may be configured to perform, based on the indication, one or more actions to gain attention from the one or more non-attentive users.

Some implementations described herein relate to a method of monitoring attention in a video conferencing session. The method may include receiving, by a system having one or more processors and from a plurality of user devices, user data corresponding to a plurality of users attending the video conferencing session. The method may include determining, by the system and based on the user data, a plurality of attention scores corresponding to the plurality of users, wherein an attention score, of the plurality of attention scores, may represent a level of attention of a corresponding user of the plurality of users. The method may include identifying, by the system and based on the plurality of attention scores, one or more non-attentive users of the plurality of users, wherein one or more attention scores, of the plurality of attention scores, corresponding to the one or more non-attentive users, may satisfy an attention score threshold. The method may include transmitting, by the system and to one or more user devices of the plurality of user devices, a notification to gain the attention of the non-attentive users.

Some implementations described herein relate to a non-transitory computer-readable medium that stores a set of instructions for a device. The set of instructions, when executed by one or more processors of the device, may cause the device to receive, from a plurality of user devices, user data corresponding to a plurality of users attending a video conferencing session. The set of instructions, when executed by one or more processors of the device, may cause the device to determine, based on the user data, a plurality of attention scores corresponding to the plurality of users, wherein an attention score, of the plurality of attention scores, represents a level of attention of a corresponding user of the plurality of users. The set of instructions, when executed by one or more processors of the device, may cause the device to identify, based on the plurality of attention scores, one or more non-attentive users of the plurality of users, wherein a corresponding attention score of a non-attentive user, of the one or more non-attentive users, indicates that the user data satisfies one or more conditions associated with a lack of attentiveness.

BRIEF DESCRIPTION OF THE DRAWINGS

FIG. 5 is a flowchart of an example process associated with attention monitoring in a video conferencing session, in accordance with some embodiments of the present disclosure.

DETAILED DESCRIPTION

The following detailed description of example implementations refers to the accompanying drawings. The same reference numbers in different drawings may identify the same or similar elements.

Multiple users may participate in a video conferencing session. For example, one user (e.g., a host user) may present or host a presentation (e.g., a webinar or an online course) to the other (guest) users. Oftentimes, with a video conferencing session, one or more users may lose attention in the video conferencing session. However, given the virtual nature of the video conferencing session, the host user may not be aware that the one or more users are losing attention. As a result, the subject matter may not be effectively communicated to the users, and computing and/or network resources used to host the video conferencing session may have been wasted. Moreover, additional computing and/or network resources may be required to communicate the subject matter at a later time to make up for the lack of effectiveness in communicating the subject matter in the original video conferencing session. Accordingly, it is desirable for a system to provide real-time feedback to one or more users in a video conferencing session to avoid wasting computing and/or network resources used to support the original and make-up video conferencing sessions.

Some implementations described herein describe a system configured to receive user data from multiple user devices corresponding to respective users participating in a video conferencing session. Based on the user data, the attention monitoring system may identify one or more non-attentive users. Furthermore, the attention monitoring system may notify a user (e.g., a host user) of the non-attentive users while the video conferencing session is in progress, to allow the user to attempt to re-gain the attention of the non-attentive users. Additionally, the attention monitoring system may automatically perform additional actions to gain the attention of the non-attentive users. In this way, the attention monitoring system may increase the effectiveness in communicating the subject matter of the video conferencing session, and therefore the efficiency of the computing and network resources used to host the video conferencing session. Additionally, additional computing resources that may be required to re-communicate the subject matter at a later time may be conserved.

Figure 1A:
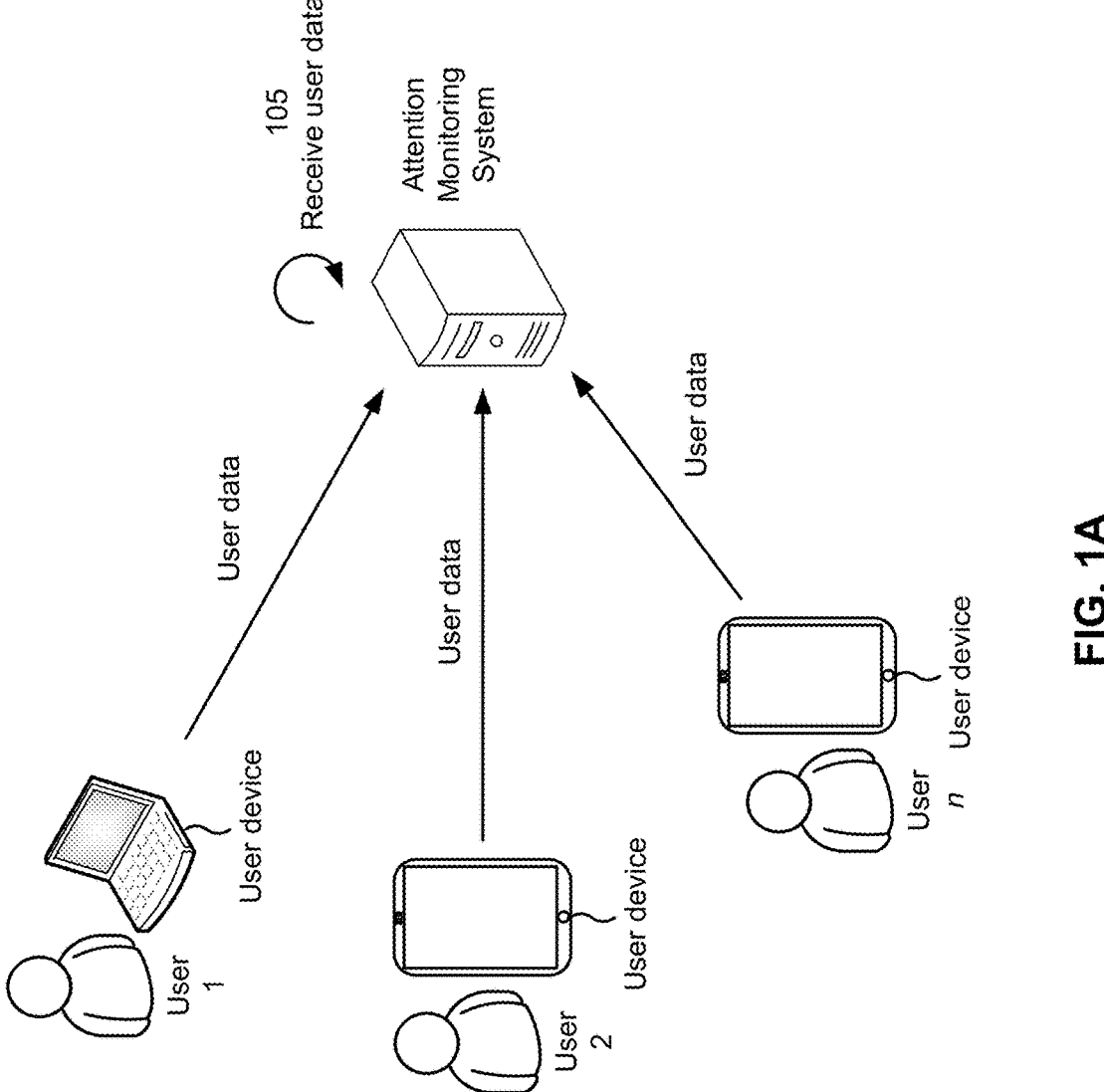
FIGS. 1A-1C are diagrams of an example associated with attention monitoring in a video conferencing session, in accordance with some embodiments of the present disclosure.
Figure 1B:
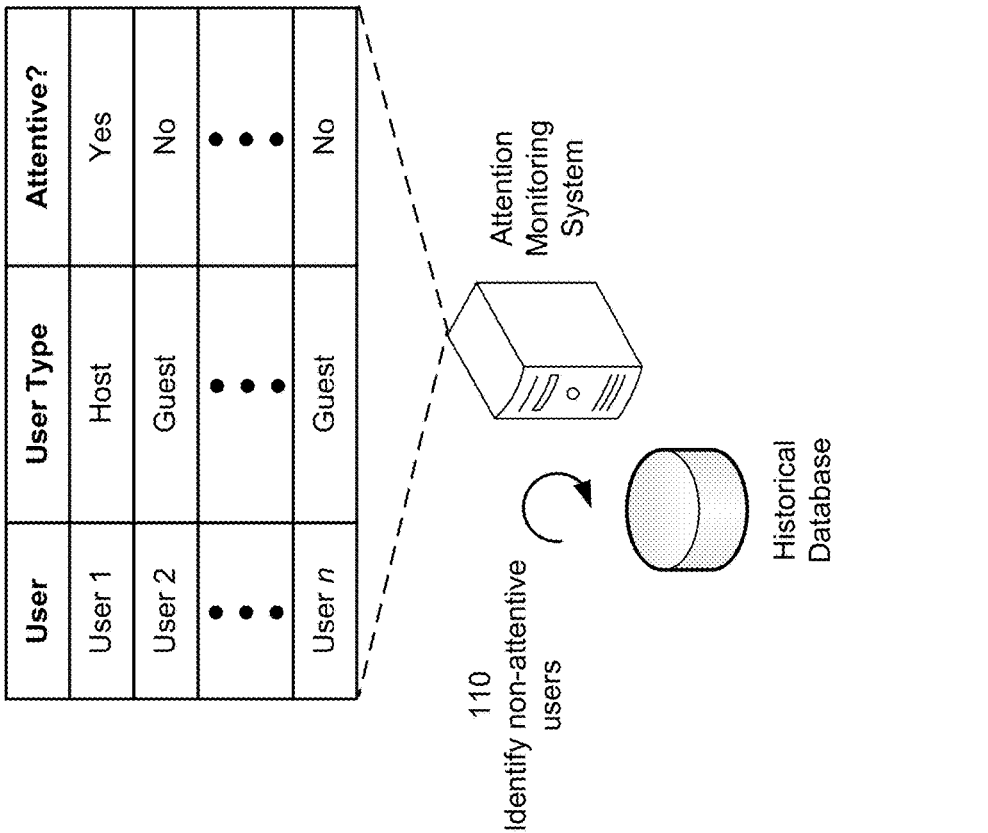
Figure 1C:
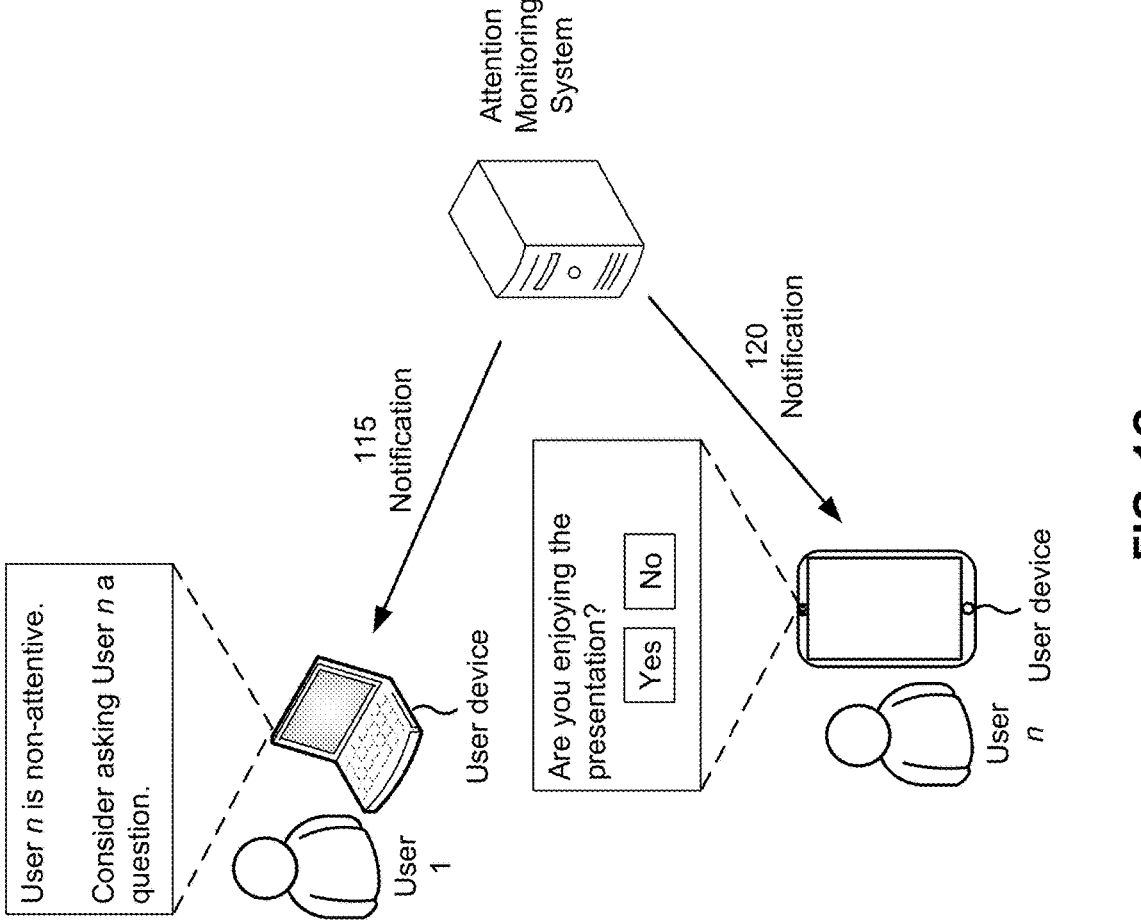

FIGS. 1A-1C are diagrams of an example 100 associated with attention monitoring in a video conferencing session. As shown in FIGS. 1A-1C, example 100 includes an attention monitoring system, multiple user devices, and a historical database. These devices are described in more detail in connection with FIGS. 3 and 4.

As shown in FIG. 1A, multiple users (e.g., User 1, User 2, . . . , User n) may participate in a video conferencing session via respective user devices corresponding to the users. In some implementations, one of the users (e.g., User 1) may be designated with a user type of a host user, and the corresponding user device may be designated as the host user device. For example, the user that initiates and/or hosts the video conferencing session (e.g., a presenter of a webinar) may automatically be designated the host user. Additionally, or alternatively, a user may be manually designated as a host user (e.g., by the user that initiates the video conferencing session). Additionally, or alternatively, the host user may be changed from one user to a different user during the video conferencing session (e.g., from one presenter to another). Additionally, or alternatively, multiple users may be designated as host users (e.g., multiple presenters and/or administrators). Users other than the host user(s) may be designated with a user type of guest users.

As shown by reference number 105, the attention monitoring system may receive user data from the user devices. In some implementations, for a particular user, the user data may include a video feed from a corresponding user device. Additionally, or alternatively, the user data may include a sound feed from the corresponding user device. Additionally, or alternatively, the user data may include user activity data indicating user activity with one or more applications operating on the corresponding user device other than the application by which the user is participating in the video conferencing session. For example, the attention monitoring system may have permissions from the user to monitor the applications operating on the user device and the user's activity with the applications. Additionally, or alternatively, the user data may include user participation data indicating participation of the particular user in the video conferencing session. For example, the user participation data may include a voice input (e.g., the user is speaking in the video conferencing session) and/or a text input (e.g., the user is typing in a chat feature of the video conferencing session and/or answering a prompt provided during the video conferencing session).

As shown in FIG. 1B, and by reference number 110, the attention monitoring system may identify one or more non-attentive users based on the user data. In some implementations, the attention monitoring system may determine if the user data satisfies one or more conditions associated with a lack of attentiveness. In scenarios in which one or more users are designated as host user(s) and the other users as guest users, the attention monitoring system may be configured to determine non-attentiveness of only users with a guest user type (e.g., identify non-attentive user(s) from the guest users).

For example, for user data that includes a video feed from a particular user device, the attention monitoring system may track and/or monitor movement of the user's eyes. By doing so, the attention monitoring system may determine if the user's eyes deviate from the camera of the user device from which the video feed is taken. Additionally, or alternatively, the attention monitoring system may determine a participation viewing direction of the particular user (e.g., if a window on the user device associated with the video conferencing session is at a different viewing angle from the camera). The attention monitoring system may determine the participation viewing direction by determining that the user's eyes are in a particular viewing direction at the beginning of the video conferencing session (e.g., during the first five minutes of the video conferencing session) and/or for an amount of time that exceeds a viewing direction threshold (e.g., for 1 minute, 2 minutes, or 5 minutes). The attention monitoring system may account for variations in the participation viewing direction (e.g., a tolerance in viewing angle of ±1 degree or ±2 degrees). Based on the participation viewing direction, the condition may be that the user's eyes deviate from the participation viewing direction (e.g., outside of the tolerance) for a number of times that exceeds a deviation amount threshold (e.g., five times or ten times). If the number of times exceeds the deviation amount threshold, then the attention monitoring system may determine that the particular user is non-attentive, and therefore, may identify the user as a non-attentive user. Additionally, or alternatively, the condition may be that the user's eyes deviate from the participation viewing direction (e.g., outside of the tolerance) for a length of time that exceeds a deviation time threshold (e.g., 1 minute, 2 minutes, or 5 minutes). If the length of time exceeds the deviation time threshold, then the attention monitoring system may determine that the particular user is non-attentive, and therefore, may identify the user as a non-attentive user.

As another example, for user data that includes user participation data indicating participation of the particular user, a condition may be that a number of inputs (e.g., voice inputs and/or text inputs) is below an input threshold (e.g., 1 input, 2 inputs, 5 inputs, or 10 inputs). In some implementations, the number of inputs may be determined within a time threshold (e.g., 5 minutes or 10 minutes). For example, if the number of inputs within the time threshold is less than the input threshold, then the attention monitoring system may determine that the particular user is non-attentive, and therefore, may identify the user as a non-attentive user. The time threshold may begin at set times during the video conferencing session (e.g., at the beginning of the video conferencing session and/or at one or intermediate times, such as 5 or 10 minute intervals). Alternatively, the time threshold may be any continuous length of time during the video conferencing session.

As another example, the condition may be based on user activity data indicating user activity with one or more applications (other than the application associated with the video conferencing session) operating on a user device corresponding to a particular user. For example, one condition may be that the number of applications exceeds a threshold number (e.g., five applications). Additionally, or alternatively, another condition may be that the user activity with one or more of the applications (e.g., the one or more applications are active applications on the user device) exceeds a time threshold (e.g., 5 minutes or 10 minutes). In some scenarios, a particular application may be related to the video conferencing session (e.g., a document being viewed in the application is relevant to the subject matter being discussed in the video conferencing session). In such scenarios, the attention monitoring system may be able to determine if a particular application is related or unrelated to the video conferencing session. For example, if the application is opened and being interacted with by a number of users (e.g., 75% or more of the users) at the same time, then the attention monitoring system may determine that the application is related to the video conferencing session. Additionally, or alternatively, if the application was opened by way of the video conferencing session (e.g., by clicking a link in a chat feature associated with the video conferencing session), then the attention monitoring system may determine that the application is related to the video conferencing session.

In some implementations, the attention monitoring system may be configured to determine attention scores corresponding to the users and based on the user data. The attention score for a particular user may represent a level of attention of the particular user. For example, each type of user data may receive a data score, and the attention score may be based on an combination of the data scores (e.g., a sum of the data scores, an average of the data scores, or a weighted average of the data scores).

As an example, for user data that includes a video feed, each deviation from the participation viewing direction, as described above, may receive a particular data score (e.g., 1 point). Alternatively, different ranges of numbers of deviations may have different data scores. For example, if the number of deviations falls within a first range (e.g., 1 to 3 deviations), then the data score may have a first value (e.g., 1 point). If the number of deviations falls within a second range (e.g., 4 to 6 deviations), then the data score may have a second value (e.g., 2 points). As another example, the data score may be based on the length of time of a particular deviation from the participation viewing direction. For example, each minute that the deviation extends may receive a data score (e.g., 1 point). Alternatively, the length of time falling within a particular range of time may receive a particular data score (e.g., 1 point for 1 to 3 minutes, 2 points for 4 to 6 minutes, etc.). Alternatively, the data scores may decrease with the number of deviations (e.g., a higher data score may be associated with greater attentiveness).

Additionally, or alternatively, for user data that includes user participation data indicating participation of the particular user, the number of inputs by the user may receive a particular data score. For example, the number of inputs falling within a first range (e.g., 0-3 inputs) may receive a first data score (e.g., 3 points), the number of inputs falling within a second range (e.g., 4-6 inputs) may receive a second data score (e.g., 2 points), and the number of inputs falling within a third range (e.g., greater than 6 inputs) may receive a third data score (e.g., 1 point). Accordingly, fewer user inputs may have a higher data score, indicating greater non-attentiveness. Alternatively, the scores may be distributed such that more user inputs results in a higher data score, indicating greater attentiveness.

Additionally, or alternatively, for user data indicating user activity data with one or more applications operating on the user device of a particular user, each application may receive a particular data score (e.g., 1 point). Alternatively, different ranges of numbers of applications may have different data scores. For example, if the number of applications falls within a first range (e.g., 1 to 3 applications), then the data score may have a first value (e.g., 1 point). If the number of applications falls within a second range (e.g., 4 to 6 applications), then the data score may have a second value (e.g., 2 points). As another example, the data score may be based on the length of time of user activity with the one or more applications. For example, each minute that the user is actively engaging with the application(s) may receive a data score (e.g., 1 point). Alternatively, the length of time falling within a particular range of time may receive a particular data score (e.g., 1 point for 1 to 3 minutes, 2 points for 4 to 6 minutes, etc.). Alternatively, the data scores may decrease with the number of applications (e.g., a higher data score may be associated with greater attentiveness).

The attention score of a particular user may be based on an average of the data scores. In some implementations, the different types of user data may be weighted by importance level and/or ranking, and the attention score may be a weighted average. For example, the user participation data (e.g., number of user inputs) may have a lowest weight for non-attentiveness (or a highest weight for attentiveness), the eye movements of the user (e.g., number of deviations from the participation viewing direction and/or length of time of the deviations) may have a second lowest/highest weight), and the user activity data (e.g., number of applications operating on the user device) may have a highest weight for non-attentiveness (or a lowest weight for attentiveness). In some implementations, the weights may follow a linear relationship with the importance rankings/levels. Alternatively, one or more of the types of user data may have a disproportionate weight (e.g., the type having a highest importance level may have a weight two times or more the weight of the type having the next highest importance level). In some implementations, the weights and/or importance levels/rankings of the types of user data may have default values and/or settings. Additionally, or alternatively, the weights and/or importance levels/rankings may be configurable and/or adjustable by an administrator of the video conferencing session (e.g., the host user). The administrator may adjust the weights and/or importance levels/rankings before, during, or after the video conferencing session.

Based on the attention score, the attention monitoring system may determine if a particular user is non-attentive, and therefore, identify the user as a non-attentive user. For example, if the corresponding attention score of the particular user satisfies an attention score threshold (e.g., the attention score exceeds the attention score threshold if the data scores are based on non-attentiveness, or the attention score falls below the attention score threshold if the data scores are based on attentiveness), then the attention monitoring system may identify the particular user as a non-attentive user. In some implementations, the attention score threshold may be based on one or more factors, such as a video conferencing type (e.g., a class, a webinar, a meeting, or a group session), a subject matter category (e.g., science, literature, programming), and/or a number of users. For example, a webinar may have a different attention score threshold than a meeting or group session (e.g., the attention score threshold relating to non-attentiveness may be greater for a webinar than a meeting, which may indicate a higher importance placed on maintaining attentiveness in the meeting than the webinar). As another example, a video conferencing session having a higher number of users (e.g., 100 people) may have a different attention score threshold than a video conferencing session having a fewer number of users (e.g., 10 people). For example, the attention score threshold relating to non-attentiveness may be greater for the video conferencing session with the higher number of users, which may indicate a higher importance placed on maintaining attentiveness in the video conferencing session when there are fewer users.

In some implementations, the attention monitoring system may use a machine learning model to determine attentiveness or non-attentiveness of the users, as described in more detail below in connection with FIG. 2. The attention monitoring system may provide, based on the user data and as input to the machine learning model, user attention data associated with attentions of the users. The attention monitoring system may receive, as output from the machine learning model, an indication that one or more non-attentive users are not attentive to the video conferencing session. Alternatively, the attention monitoring system may receive, as output from the machine learning model, attention scores for the users from which the attention monitoring system may identify the non-attentive user(s) as described above. The machine learning model may be trained based on historical user attention data associated with a plurality of historical video conferencing sessions, which may be stored on and accessed from a historical database.

In some implementations, the machine learning model may be trained to determine the non-attentive users and/or the attention scores based on one or more factors, such as a video conferencing type (e.g., a class, a webinar, a meeting, or a group session), a subject matter category (e.g., science, literature, programming), and/or one or more attributes associated with a particular user or user type. For example, based on user data associated with a particular user, the machine learning model may determine that the particular user is non-attentive in a class video conferencing type, but is attentive in a meeting video conferencing type based on the same or similar user data. As another example, the machine learning model may determine that a particular user of a specific age or within an age range (e.g., 18-50) is attentive, but another user of a different age or within a different age range (e.g., 12-17) is not attentive based on the same or similar user data. As another example, the machine learning model may be able to identify the particular user and determine attentiveness and/or a corresponding score based on the particular user's attention history. Based on the user's history, the machine learning model may determine that the particular user is attentive, but may determine that another user, having the same or similar user data, is not attentive based on that user's attention history. In some implementations, the attention monitoring system may utilize different machine learning models based on the different factors. For example, there may be one machine learning model for a class video conferencing type, another machine learning model for a webinar video conferencing type, etc.

As shown in FIG. 1C, the attention monitoring system may perform one or more actions based on identifying the non-attentive user(s). In some implementations, the attention monitoring system may determine if the number of non-attentive users satisfies a number threshold before performing the action. The number threshold may be an actual number value (e.g., 5 users, 10 users, or 20 users) or may be a percentage of total users (e.g., 5%, 10%, or 20%). If the number of non-attentive users satisfies the number threshold (e.g., meets or exceeds the number threshold), then the attention monitoring system may perform the action.

In some implementations, the attention monitoring system may transmit a notification to all users. The notification may be a sound or a message requesting and/or requiring a certain level of engagement of the users.

Alternatively, as shown by reference number 115, the attention monitoring system may transmit a notification to the user device designated as a host user device and corresponding to a host user. The notification may be an audio notification (e.g., a bell) providing an indication to the host user that one or more users are non-attentive, which may signal to the host user that some action may be needed to gain the attention of the non-attentive user(s). Additionally, or alternatively, the notification may include one or more suggestions of action(s) for the host user to take (e.g., asking a question, playing an engaging video, or the like). Additionally, or alternatively, the notification may specifically identify to the host user the identities of the non-attentive user(s), which may allow the host user to take action directed specifically at the non-attentive user(s) (e.g., by asking a question directly to the non-attentive user(s)).

Additionally, or alternatively, as shown by reference number 120, the attention monitoring system may transmit a notification to each of the non-attentive users. The notification may be an audio notification including a sound (e.g., a verbal message to start paying attention). Additionally, or alternatively, the notification may include one or more questions associated with the video conferencing session (e.g., questions regarding the content and/or questions regarding feedback from the non-attentive user).

As described above, the attention monitoring system is able to identify non-attentive users, of multiple users, participating in a video conferencing session based on user data received from user devices corresponding to the users. By identifying the non-attentive users, the attention monitoring system may provide real-time feedback to a host user (e.g., a presenter) so that the host user may attempt to re-engage the non-attentive users while the video conferencing session is in progress, thereby increasing the effectiveness in communicating the subject matter of the video conferencing session. By allowing the re-engagement of the non-attentive users during the actual video conferencing session, additional computing resources that may be required to re-communicate the subject matter at a later time may be conserved.

As indicated above, FIGS. 1A-1C are provided as an example. Other examples may differ from what is described with regard to FIGS. 1A-1C.

Figure 2:
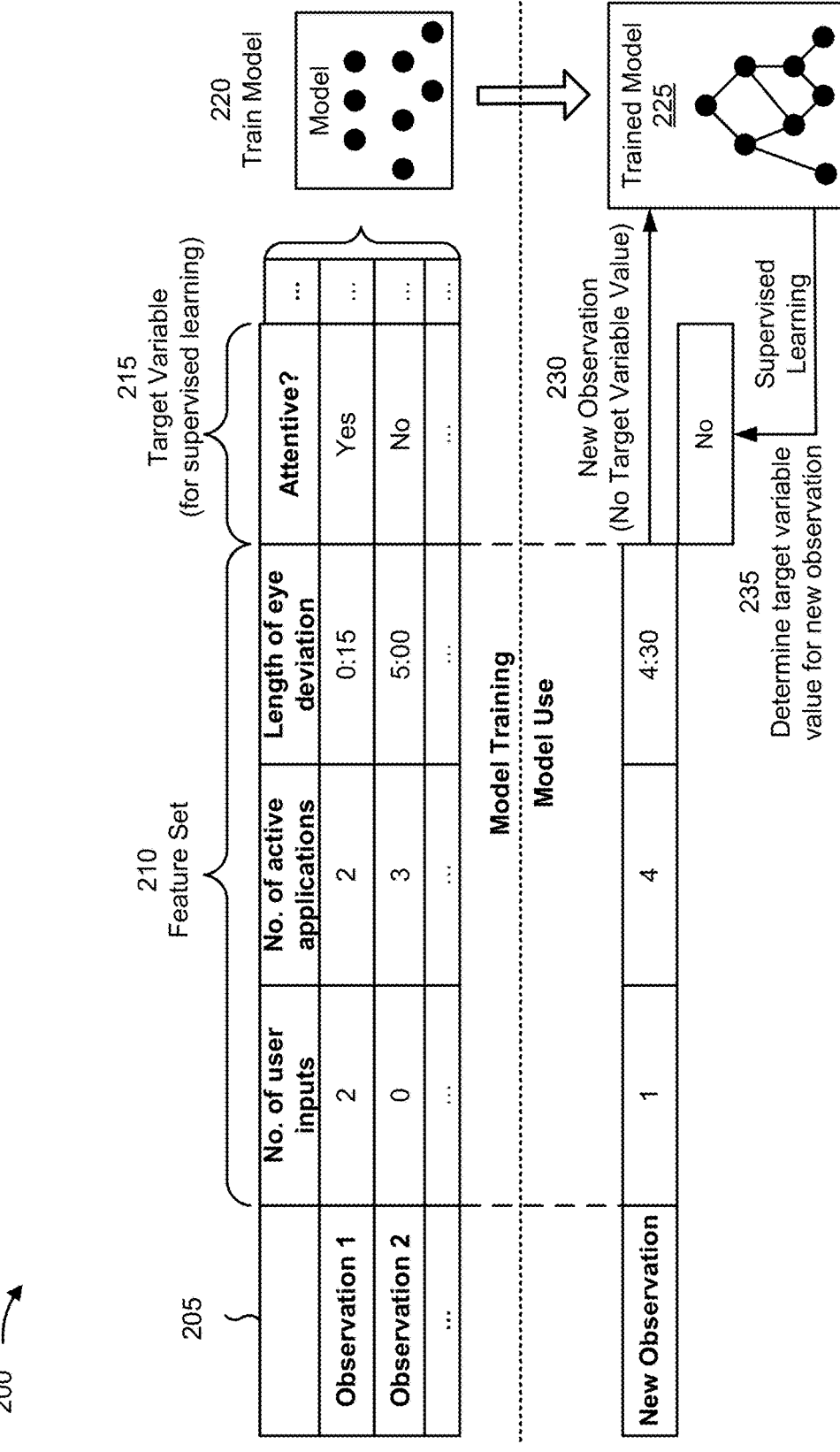
FIG. 2 is a diagram illustrating an example of training and using a machine learning model in connection with attention monitoring in a video conferencing session, in accordance with some embodiments of the present disclosure.

FIG. 2 is a diagram illustrating an example 200 of training and using a machine learning model in connection with attention monitoring in a video conferencing session. The machine learning model training and usage described herein may be performed using a machine learning system. The machine learning system may include or may be included in a computing device, a server, a cloud computing environment, or the like, such as the attention monitoring system described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the attention monitoring system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the attention monitoring system. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of a number of user inputs, a second feature of a number of active applications, a third feature of a length of eye deviation, and so on. As shown, for a first observation, the first feature may have a value of 2, the second feature may have a value of 2, the third feature may have a value of 0.15 seconds, and so on. These features and feature values are provided as examples, and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is whether or not a particular user is attentive, which has a value of "Yes" for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As an example, the machine learning system may obtain training data for the set of observations based on trained based on historical user attention data associated with a plurality of historical video conferencing sessions.

As shown by reference number 230, the machine learning system may apply the trained machine learning model 225 to a new observation, such as by receiving a new observation and inputting the new observation to the trained machine learning model 225. As shown, the new observation may include a first feature of a number of inputs, which has a value of 1, a second feature of a number of active applications, which has a value of 2, a third feature of length of eye deviation, which has a value of 5 seconds, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of "No" for the target variable of attentiveness for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, providing, to one of the user devices (e.g., a host user device) one or more suggestions to gain the attention of any non-attentive users (e.g., users for which the value for the target variable is "No"). The first automated action may include, for example, transmitting a notification to the user device(s) of non-attentive user(s).

In some implementations, the trained machine learning model 225 may be re-trained using feedback information. For example, feedback may be provided to the machine learning model. The feedback may be associated with actions performed based on the recommendations provided by the trained machine learning model 225 and/or automated actions performed, or caused, by the trained machine learning model 225. In other words, the recommendations and/or actions output by the trained machine learning model 225 may be used as inputs to re-train the machine learning model (e.g., a feedback loop may be used to train and/or update the machine learning model). For example, the feedback information may include input received from one or more user devices in response to the notification transmitted by the attention monitoring system based on a value of "No" for the target variable (e.g., correct answers to one or more questions included in the notification).

In this way, the machine learning system may apply a rigorous and automated process to monitor attentiveness of users in a video conferencing session. The machine learning system enables recognition and/or identification of tens, hundreds, thousands, or millions of features and/or feature values for tens, hundreds, thousands, or millions of observations, thereby increasing accuracy and consistency and reducing delay associated with monitoring attentiveness of users in a video conferencing session relative to requiring computing resources to be allocated for tens, hundreds, or thousands of operators to manually monitor attentiveness of users in a video conferencing session using the features or feature values.

As indicated above, FIG. 2 is provided as an example. Other examples may differ from what is described in connection with FIG. 2.

Figure 3:
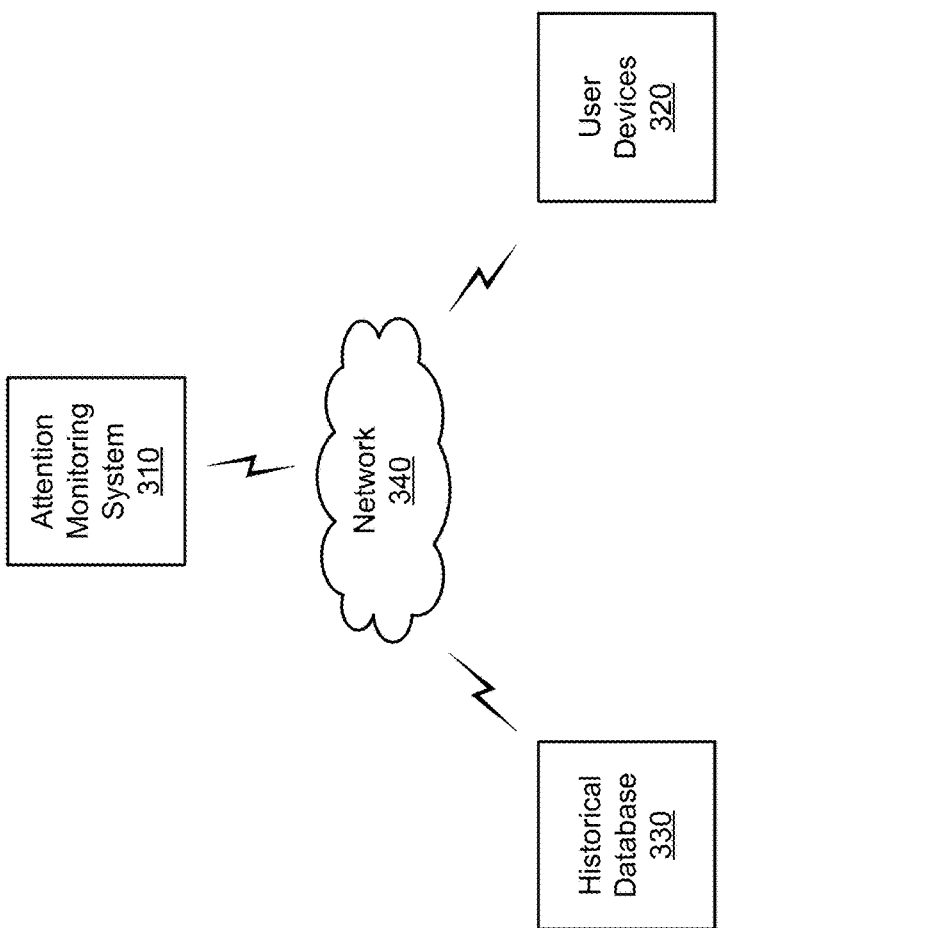
FIG. 3 is a diagram of an example environment in which systems and/or methods described herein may be implemented, in accordance with some embodiments of the present disclosure.

FIG. 3 is a diagram of an example environment 300 in which systems and/or methods described herein may be implemented. As shown in FIG. 3, environment 300 may include an attention monitoring system 310, user devices 320, a historical database 330, and a network 340. Devices of environment 300 may interconnect via wired connections, wireless connections, or a combination of wired and wireless connections.

The attention monitoring system 310 includes one or more devices capable of receiving, generating, storing, processing, providing, and/or routing information associated with attention monitoring in a video conferencing session, as described elsewhere herein. The attention monitoring system 310 may include a communication device and/or a computing device. For example, the attention monitoring system 310 may include a server, such as an application server, a client server, a web server, a database server, a host server, a proxy server, a virtual server (e.g., executing on computing hardware), or a server in a cloud computing system. In some implementations, the attention monitoring system 310 includes computing hardware used in a cloud computing environment.

The user devices 320 each may include one or more devices capable of receiving, generating, storing, processing, and/or providing information associated with attention monitoring in a video conferencing session, as described elsewhere herein. The user devices 320 each may include a communication device and/or a computing device. For example, the user devices 320 each may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The historical database 330 may include one or more devices capable of receiving, generating, storing, processing, and/or providing information associated with attention monitoring in a video conferencing session, as described elsewhere herein. The historical database 330 may include a communication device and/or a computing device. For example, the historical database 330 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the historical database 330 may store historical user attention data associated with a plurality of historical video conferencing sessions, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
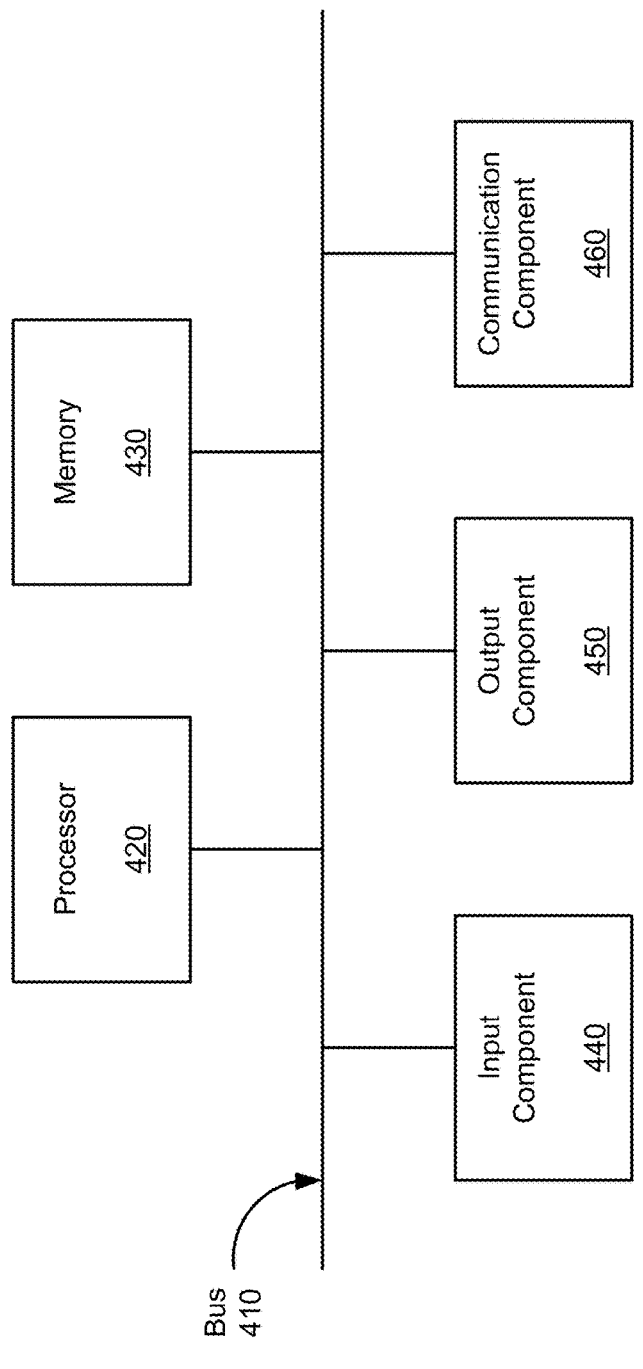
FIG. 4 is a diagram of example components of a device associated with attention monitoring in a video conferencing session, in accordance with some embodiments of the present disclosure.

FIG. 4 is a diagram of example components of a device 400 associated with attention monitoring in a video conferencing session. Device 400 may correspond to attention monitoring system 310, user devices 320, and/or historical database 330. In some implementations, attention monitoring system 310, user devices 320, and/or historical database 330 may include one or more devices 400 and/or one or more components of device 400. As shown in FIG. 4, device 400 may include a bus 410, a processor 420, a memory 430, an input component 440, an output component 450, and a communication component 460.

Bus 410 may include one or more components that enable wired and/or wireless communication among the components of device 400. Bus 410 may couple together two or more components of FIG. 4, such as via operative coupling, communicative coupling, electronic coupling, and/or electric coupling. Processor 420 may include a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 may include one or more processors capable of being programmed to perform one or more operations or processes described elsewhere herein.

Memory 430 may include volatile and/or nonvolatile memory. For example, memory 430 may include random access memory (RAM), read only memory (ROM), a hard disk drive, and/or another type of memory (e.g., a flash memory, a magnetic memory, and/or an optical memory). Memory 430 may include internal memory (e.g., RAM, ROM, or a hard disk drive) and/or removable memory (e.g., removable via a universal serial bus connection). Memory 430 may be a non-transitory computer-readable medium. Memory 430 stores information, instructions, and/or software (e.g., one or more software applications) related to the operation of device 400. In some implementations, memory 430 may include one or more memories that are coupled to one or more processors (e.g., processor 420), such as via bus 410.

Input component 440 may enable device 400 to receive input, such as user input and/or sensed input. For example, input component 440 may include a touch screen, a keyboard, a keypad, a mouse, a button, a microphone, a switch, a sensor, a global positioning system sensor, an accelerometer, a gyroscope, and/or an actuator. Output component 450 enables device 400 to provide output, such as via a display, a speaker, and/or a light-emitting diode. Communication component 460 enables device 400 to communicate with other devices via a wired connection and/or a wireless connection. For example, communication component 460 may include a receiver, a transmitter, a transceiver, a modem, a network interface card, and/or an antenna.

Device 400 may perform one or more operations or processes described herein. For example, a non-transitory computer-readable medium (e.g., memory 430) may store a set of instructions (e.g., one or more instructions or code) for execution by processor 420. Processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry is used instead of or in combination with the instructions to perform one or more operations or processes described herein. Additionally, or alternatively, processor 420 may be configured to perform one or more operations or processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 associated with attention monitoring in a video conferencing session. In some implementations, one or more process blocks of FIG. 5 may be performed by the attention monitoring system 310. In some implementations, one or more process blocks of FIG. 5 may be performed by one or more components of the device 400, such as processor 420, memory 430, input component 440, output component 450, and/or communication component 460.

As shown in FIG. 5, process 500 may include receiving user data from a plurality of user devices corresponding to a plurality of users participating in the video conferencing session (block 510). For example, the attention monitoring system 310 (e.g., using processor 420, memory 430, input component 440, and/or communication component 460) may receive user data from a plurality of user devices corresponding to a plurality of users participating in the video conferencing session, as described above in connection with reference number 105 of FIG. 1A. As an example, the attention monitoring system may receive user data from the user devices.

As further shown in FIG. 5, process 500 may include providing, based on the user data and as input to a machine learning model, user attention data associated with attentions of the plurality of users with respect to the video conferencing session (block 520). For example, the attention monitoring system 310 (e.g., using processor 420 and/or memory 430) may provide, based on the user data and as input to a machine learning model, user attention data associated with attentions of the plurality of users with respect to the video conferencing session, wherein the machine learning model is trained based on historical user attention data associated with a plurality of historical video conferencing sessions, as described above in connection with reference number 110 of FIG. 1B. As an example, the attention monitoring system may use a machine learning model to determine attentiveness or non-attentiveness of the users. The attention monitoring system may provide, based on the user data and as input to the machine learning model, user attention data associated with attentions of the users.

As further shown in FIG. 5, process 500 may include receiving, as output from the machine learning model, an indication that one or more non-attentive users, of the plurality of users, are not attentive to the video conferencing session (block 530). For example, the attention monitoring system 310 (e.g., using processor 420, memory 430, input component 440, and/or communication component 460) may receive, as output from the machine learning model, an indication that one or more non-attentive users, of the plurality of users, are not attentive to the video conferencing session, as described above in connection with reference number 110 of FIG. 1B. As an example, the attention monitoring system may receive, as output from the machine learning model, an indication that one or more non-attentive users are not attentive to the video conferencing session.

As further shown in FIG. 5, process 500 may include performing, based on the indication, one or more actions to gain attention from the one or more non-attentive users (block 540). For example, the attention monitoring system 310 (e.g., using processor 420 and/or memory 430) may perform, based on the indication, one or more actions to gain attention from the one or more non-attentive users, as described above in connection with reference numbers 115 and/or 120 of FIG. 1C. As an example, the attention monitoring system may perform one or more actions based on identifying the non-attentive user(s). For example, the attention monitoring system may transmit a notification to the user device designated as a host user device and corresponding to a host user. Additionally, or alternatively, the attention monitoring system may transmit a notification to each of the non-attentive users.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1C. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of monitoring attention in a video conferencing session, comprising:
  receiving, by a system having one or more processors and from a plurality of user devices, user data corresponding to a plurality of users attending the video conferencing session;
  determining, by the system and based on processing the user data with a machine learning model, a plurality of attention scores corresponding to the plurality of users,
    wherein the machine learning model is trained based on historical user attention data associated with a plurality of historical video conferencing sessions, and
    wherein an attention score, of the plurality of attention scores, represents a level of attention of a corresponding user of the plurality of users;
  identifying, by the system and based on the plurality of attention scores, one or more non-attentive users of the plurality of users,
    wherein one or more attention scores, of the plurality of attention scores, corresponding to the one or more non-attentive users satisfy an attention score threshold;
  determining, by the system, whether a number of the one or more non-attentive users satisfies a threshold value; and
  transmitting, by the system, to one or more user devices of the plurality of user devices associated with the identified one or more non-attentive users, and based on determining whether the number of the one or more non-attentive users satisfies a threshold value, a notification to gain the attention of the one or more non-attentive users.

2. The method of claim 1, wherein the video conferencing session is associated with a video conferencing type, and
  wherein the attention score threshold is based, at least in part, on the video conferencing type.

3. The method of claim 1, wherein the video conferencing session is associated with a video conferencing type, and
  wherein the attention score threshold is based, at least in part, on a number of users of the plurality of users.

4. The method of claim 1, wherein the video conferencing session is associated with a subject matter category, and
  wherein the attention score threshold is based, at least in part, on the subject matter category.

5. The method of claim 1, wherein the user data for a particular user, of the plurality of users, includes a video feed from a corresponding user device of the plurality of user devices, and wherein the method further comprises:
  determining, from the video feed, a participation viewing direction of the particular user,
    wherein a corresponding attention score, of the plurality of attention scores, corresponding to the particular user is based on one or more deviations of eyes of the particular user from the participation viewing direction for at least a deviation time threshold.

6. The method of claim 1, wherein the user data for a particular user, of the plurality of users, includes user participation data indicating participation of the particular user in the video conferencing session,
  wherein the user participation data includes one or more user inputs by the particular user, and
  wherein a corresponding attention score, of the plurality of attention scores, corresponding to the particular user is based on the one or more user inputs.

7. The method of claim 1, wherein the user data for a particular user, of the plurality of users, includes user activity data indicating user activity with one or more applications operating on a corresponding user device, of the plurality of user devices, and
  wherein a corresponding attention score, of the plurality of attention scores, corresponding to the particular user is based on the user activity data.

8. A non-transitory computer-readable medium storing a set of instructions, the set of instructions comprising:
  one or more instructions that, when executed by one or more processors of a device, cause the device to:
    receive, from a plurality of user devices, user data corresponding to a plurality of users attending a video conferencing session;
    determine, based on processing the user data with a machine learning model, a plurality of attention scores corresponding to the plurality of users,
      wherein the machine learning model is trained based on historical user attention data associated with a plurality of historical video conferencing sessions, and
      wherein an attention score, of the plurality of attention scores, represents a level of attention of a corresponding user of the plurality of users;
    identify, based on the plurality of attention scores, one or more non-attentive users of the plurality of users,
      wherein a corresponding attention score of a non-attentive user, of the one or more non-attentive users, indicates that the user data satisfies one or more conditions associated with a lack of attentiveness;
    determine whether a number of the one or more non-attentive users satisfies a threshold value; and
    perform one or more actions to gain attention from the one or more non-attentive users, wherein the one or more actions include:
      transmitting, to one or more user devices of the plurality of user devices associated with the identified one or more non-attentive users, and based on determining whether the number of the one or more non-attentive users satisfies a threshold value, a notification to gain the attention from the one or more non-attentive users.

9. The non-transitory computer-readable medium of claim 8, wherein the user data for a particular user, of the plurality of users, includes a video feed from a corresponding user device of the plurality of user devices, and wherein the one or more instructions, when executed by the one or more processors, further cause the device to:

track, from the video feed, movement of eyes of the particular user; and determine a participation viewing direction of the particular user, wherein one condition, of the one or more conditions, is that the eyes of the particular user deviate from the participation viewing direction for at least a deviation time threshold.

10. The non-transitory computer-readable medium of claim 8, wherein the user data for a particular user, of the plurality of users, includes user participation data indicating participation of the particular user in the video conferencing session, wherein the user participation data includes one or more user inputs by the particular user, and wherein one condition, of the one or more conditions, is that a number of user inputs by the particular user is below an input threshold within a time threshold.

11. The non-transitory computer-readable medium of claim 8, wherein the user data for a particular user, of the plurality of users, includes user activity data indicating user activity with one or more applications operating on a corresponding user device of the plurality of user devices, and wherein one condition, of the one or more conditions, is that user activity with the one or more applications exceeds a time threshold.

12. The non-transitory computer-readable medium of claim 8, wherein the one or more instructions, that cause the device to perform the one or more actions, cause the device to:

perform the one or more actions when a number of non-attentive users satisfies a number threshold.

13. A system, comprising:

one or more memories; and one or more processors, communicatively coupled to the one or more memories, configured to:

receive, from a plurality of user devices, user data corresponding to a plurality of users attending a video conferencing session;

determine, based on processing the user data with a machine learning model, a plurality of attention scores corresponding to the plurality of users, wherein the machine learning model is trained based on historical user attention data associated with a plurality of historical video conferencing sessions, and wherein an attention score, of the plurality of attention scores, represents a level of attention of a corresponding user of the plurality of users;

identify, based on the plurality of attention scores, one or more non-attentive users of the plurality of users, wherein one or more attention scores, of the plurality of attention scores, corresponding to the one or more non-attentive users satisfy an attention score threshold;

determine whether a number of the one or more non-attentive users satisfies a threshold value; and transmit, to one or more user devices of the plurality of user devices associated with the identified one or more non-attentive users, and based on determining whether the number of the one or more non-attentive users satisfies a threshold value, a notification to gain the attention of the one or more non-attentive users.

14. The system of claim 13, wherein the video conferencing session is associated with a video conferencing type, and wherein the attention score threshold is based, at least in part, on the video conferencing type.

15. The system of claim 13, wherein the video conferencing session is associated with a video conferencing type, and wherein the attention score threshold is based, at least in part, on a number of users of the plurality of users.

16. The system of claim 13, wherein the video conferencing session is associated with a subject matter category, and wherein the attention score threshold is based, at least in part, on the subject matter category.

17. The system of claim 13, wherein the user data for a particular user, of the plurality of users, includes a video feed from a corresponding user device of the plurality of user devices, and wherein the one or more processors are further configured to:

determine, from the video feed, a participation viewing direction of the particular user, wherein a corresponding attention score, of the plurality of attention scores, corresponding to the particular user is based on one or more deviations of eyes of the particular user from the participation viewing direction for at least a deviation time threshold.

18. The system of claim 13, wherein the user data for a particular user, of the plurality of users, includes user participation data indicating participation of the particular user in the video conferencing session, wherein the user participation data includes one or more user inputs by the particular user, and wherein a corresponding attention score, of the plurality of attention scores, corresponding to the particular user is based on the one or more user inputs.

19. The system of claim 13, wherein the user data for a particular user, of the plurality of users, includes user activity data indicating user activity with one or more applications operating on a corresponding user device, of the plurality of user devices, and wherein a corresponding attention score, of the plurality of attention scores, corresponding to the particular user is based on the user activity data.

20. The system of claim 13, wherein the one or more processors are further configured to:

transmit the notification based on a number of non-attentive users satisfying a threshold value.

* * * * *